H. ANDERSON.
Wagon Brake.
No. 84,463.
Patented Dec. 1, 1868.
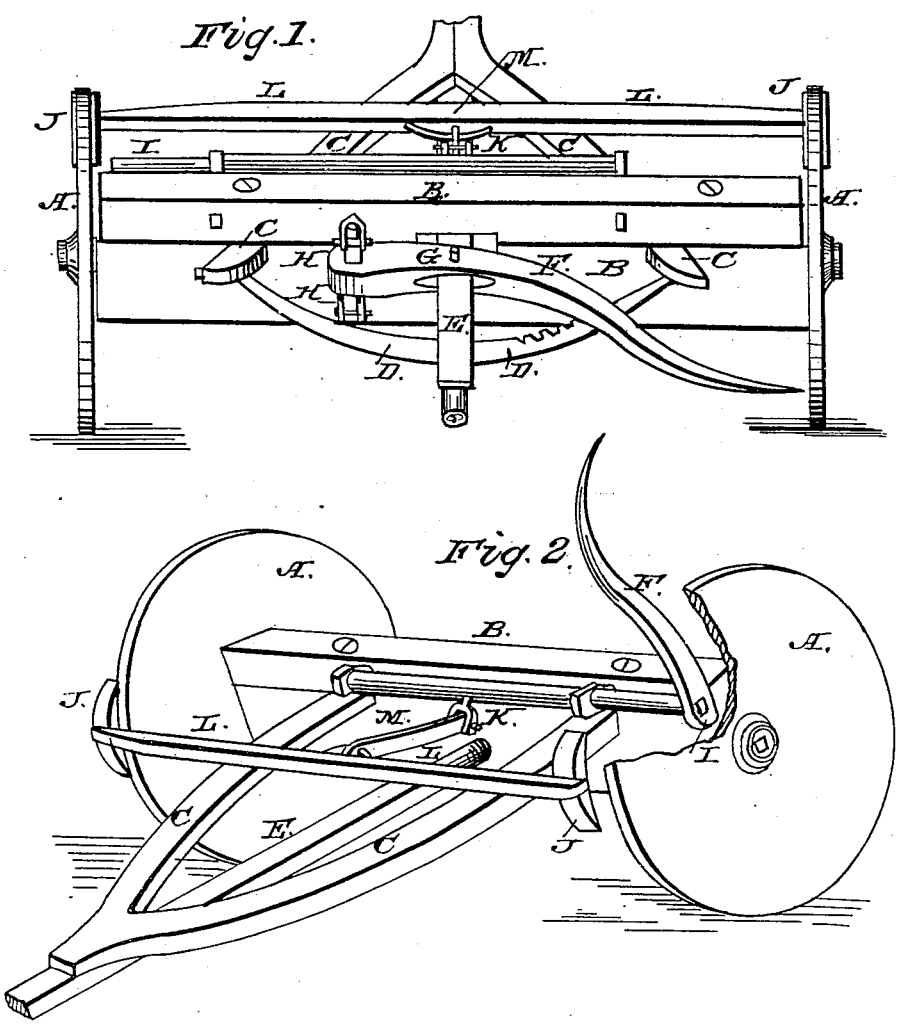
Witnesses
Inventor:
Henry Anderson

HENRY ANDERSON, OF SHEPHERDSTOWN, PENNSYLVANIA.

Letters Patent No. 84,463, dated December 1, 1868.

IMPROVED WAGON-BRAKE.

The Schedule referred to in these Letters Patent and making part of the same.

*To all whom it may concern:*

Be it known that I, HENRY ANDERSON, of Shepherdstown, Cumberland county, Pennsylvania, have made and invented a new and useful improved Wagon-Brake; and I do hereby declare that the following is a full, clear, and exact description of the construction and operation of the same, reference being had to the annexed drawings, forming a part of this specification, in which—

Figure 1 is a perspective view of the brake when the lever is used from the rear of the wagon.

Figure 2 is a perspective view of the brake when the lever is used from the side of the wagon.

To enable others skilled in the art to make and use my invention, I will proceed to describe its construction and operation.

A and A are the wheels of the wagon.

B and B are the parts of the axle, or the axle and bolster.

C and C are the hounds.

D D is an iron or steel semicircular ratchet, the ends of which are fastened in the rear of the axle B.

E is a straight rectangular bar, passing through the axle B, and through the middle of the lever F, and fastened thereto by the pin G.

H H is a small upright post, square in the middle and round at the ends, passing through the end, and forming the fulcrum of the lever F, when the brake is used from the rear.

On the front of the axle B there is fastened the revolving bar I, made square at the end next or nearest the wheel.

On the end of the bar I, the lever F, having been removed from the post H H, is placed, forming thereof a fulcrum when the brake is used from the side.

J and J are the rubber-blocks, placed on the ends of the rubber-bar L L.

The bar L L is joined by the bar M to the bar E, which connects it with the lever F in the rear.

The bar M, being disconnected from E, is easily joined to the circular bar I by the pin K, when, the lever F being applied to the end of I, the side brake is formed.

The invention is, therefore, readily changed from a rear to a side brake, and *vice versa*, to suit the convenience of the party using it.

The rear brake is shown in fig. 1 of the drawings, and the side brake is shown in fig. 2 of the same.

What I claim, and desire to secure by Letters Patent of the United States, is—

The metallic semicircular ratchet D D, the bar E, and the lever F joined thereto by the pin G, the small upright post H H, passing through the end and forming the fulcrum of the lever F, the bar I, the rubber-blocks J J, the part K, the rubber-bar L L, and the bar M, all constructed and combined, in the manner and for the purpose herein set forth.

HENRY ANDERSON.

Witnesses:
 W. F. HENWOOD,
 FRANK E. BELTZHOOVER.